United States Patent

[11] 3,602,453

| [72] | Inventor | Ray Holmes |
| | | 1118 Spring St., Collinsville, Okla. 74021 |
| [21] | Appl. No. | 879,386 |
| [22] | Filed | Nov. 24, 1969 |
| [45] | Patented | Aug. 31, 1971 |

[54] DEPTH CONTROL FOR FISHING REEL
5 Claims, 6 Drawing Figs.

[52] U.S. Cl. ................................................... 242/84.2 A
[51] Int. Cl. ....................................................... A01k 89/00
[50] Field of Search ........................................... 242/84.2 R, 84.2 A, 84.21 A, 84.2 B

[56] References Cited
UNITED STATES PATENTS

| 2,731,756 | 1/1956 | Nelson | 242/84.2 R |
| 3,000,586 | 9/1961 | Mandolf | 242/84.2 A |
| 3,105,650 | 10/1963 | Kuether | 242/84.2 A |
| 3,503,570 | 3/1970 | Coshow | 242/84.2 A |

Primary Examiner—Billy S. Taylor
Attorney—Head & Johnson

ABSTRACT: A fishing reel of the spin-cast type includes a line spool having forward and rearward storage areas thereon. Once the desired length of fishing line is established, a lever-actuated travel mechanism moves the spool rearwardly to present the forward storage area for receiving the desired length of line during line takeup and releasing the same length during casting and to concurrently exclude the residual line on the rearward storage area from being utilized during the casting operation.

INVENTOR.
RAY HOLMES

INVENTOR.
RAY HOLMES

BY *Head & Johnson*

ATTORNEYS

DEPTH CONTROL FOR FISHING REEL

BACKGROUND OF THE INVENTION

This invention relates to fishing reels and more particularly to a fishing reel having means thereon to control the length of line released during casting.

This invention concerns a reel of the type wherein a revolving spooling member convolutes monofilament fishing line onto a stationary storage spool. Such reels are commonly known in the industry as spin-cast reels and are manufactured under various trade names, an example of which is the ABU-MATIC 170 made by Garcia.

When a fisherman, through trial and error, has found the particular spot where the fish are located, he desires to put the fishhook in the same spot on subsequent casts. Heretofore such successive casting to the same spot on subsequent casts. Heretofore such successive casting to the same identical spot has been accomplished only be the manual manipulation of the reel by the fisherman; the accuracy of each cast was dependent upon the particular skill of the fisherman.

It is therefore an object of this invention to present a spin-cast fishing reel having means thereon to limit the length of line released during casting to a prescribed amount.

It is another object of the invention to present a spin-cast fishing reel having a line spool embodying two line storage areas which are operably presented to accept line during fishing line windup and to release line during the casting cycle.

It is a further object of the invention to present a spin-cast fishing reel wherein the line spool embodies dual storage areas and is forwardly and rearwardly movable to operably present one of the storage areas for and simultaneously exclude the other storage area from releasing fishing line during casting.

SUMMARY OF THE INVENTION

Generally the invention consists of a spinning reel having a frame, a line spool affixed to the frame, a spooling member rotatably carried by the frame concentric with and forward of the storage spool, and a cover plate enclosing the line spool and the spooling member. The cover plate contains a control eyelet through which the line passes to and from the line spool and a fishing rod to which the reel is attached. The line spool incorporates thereon dual storage areas having mutual line communication. A travel mechanism located within the frame operably moves the line spool forwardly and rearwardly to present one of the storage areas for and to simultaneously exclude the other storage area from accepting line during rotation of the spooling member and releasing line during casting.

DETAILED DESCRIPTION OF THE PREFERRED EMBODIMENT

Figure 1:
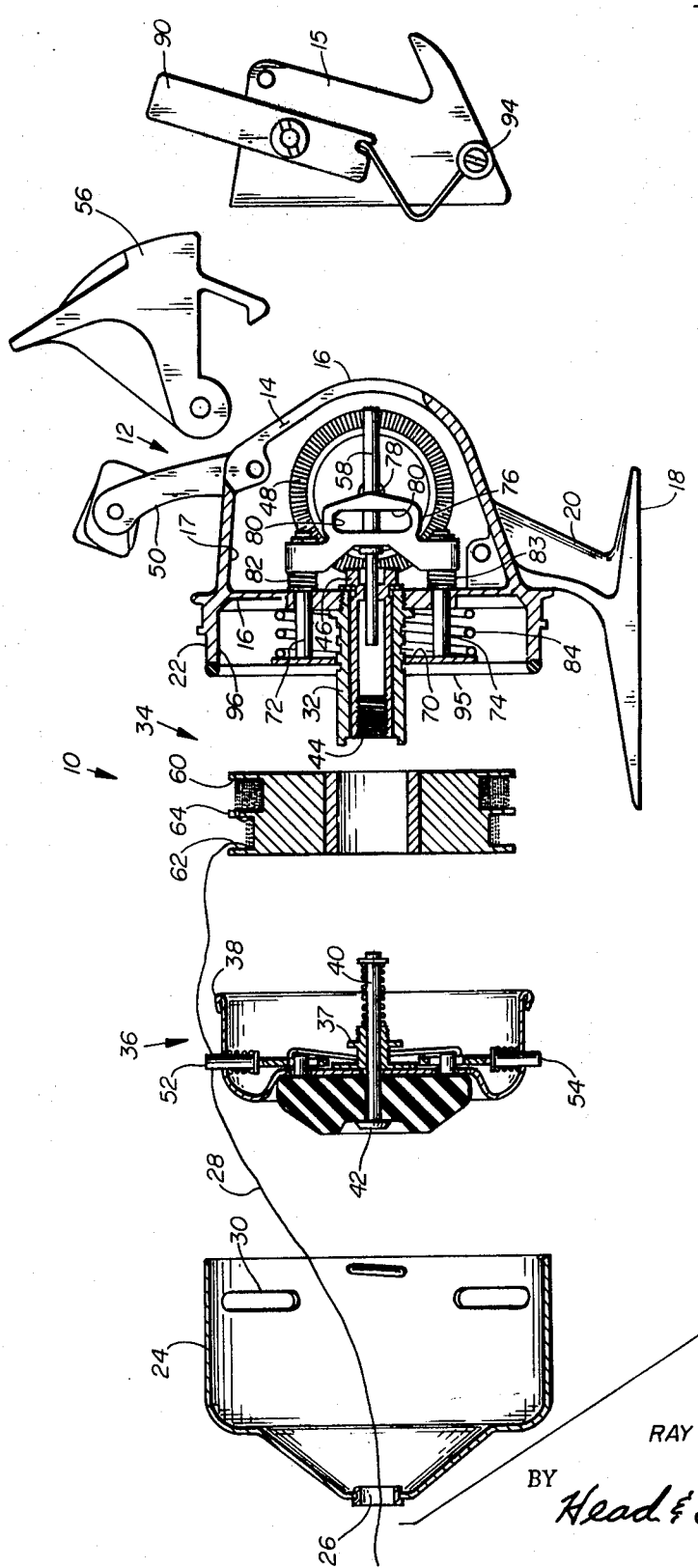
FIG. 1 is an exploded side view of the fishing reel showing the various elements thereof.
Figure 2:
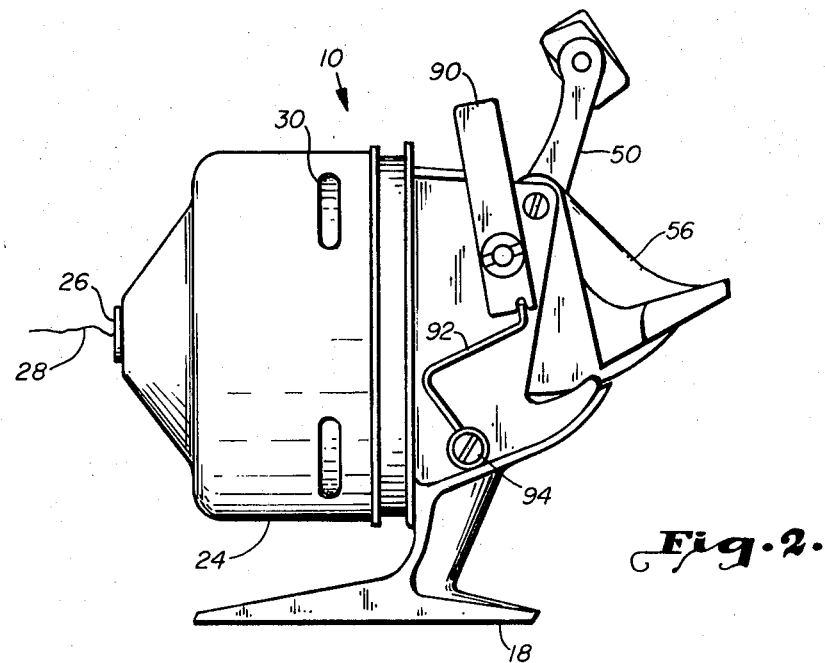
FIG. 2 is an assembled side view of the reel.

Looking now at the exploded view as shown in FIG. 1, the fishing reel, generally denoted as 10, includes a frame 12 having a rearwardly arcuate housing wall 14 and forward of the housing wall a circular faceplate 16. Removable sideplates 15 cooperate with the housing wall and faceplate to define a frame cavity 17. The frame further includes a tang 18 connected to the exterior of the housing wall 14 by a shank 20. The tang 18 is utilized in attaching the fishing reel in the ordinary seat of a fishing rod, not shown, having parallel spaced grommets along the length thereof.

A flange 22 projects forwardly from the periphery of faceplate 16 and includes thereon suitable means such as threads which receive and carry the rearward end of a cover 24. The rearward portion of cover 24 is cylindrical in shape but forwardly thereof it is rounded towards the center where there is located an eyelet 26 through which monofilament fishing line 28 passes in its journey to and from the reel 10. The cover 24 when secured to flange 22 encloses the forward working components of the reel and has cut therein a plurality of slots 30 therein to provide air circulation for drying wet line.

Still looking to FIG. 1, the working parts of the reel are shown in exploded relationship. Projecting forwardly through faceplate 16 is a bearing 32. Concentric with and journaled over bearing 32 is a line spool 34, the novel construction of which and the attachment thereof to frame 12 will be subsequently detailed.

Forward of the storage spool 34 is a spooling member 36 having a rearwardly extending peripheral flange 38 which extends outwardly of and over the line spool 34. The spooling member 36 has a center opening which accommodates a rearwardly extending pin 40 which is held to the spooling member 36 by retaining nut 42. Rigidly affixed to spooling member 36 and journaled over pin 40 is a rearwardly projecting stud 37 having male threads.

A threaded sleeve 44, riding in the interior of bearing 32, threadably engages stud 37. The rearward end of sleeve 44, located within the frame cavity 17, is a pinion gear 46 which engages a second gear 48 to which is attached exteriorly of the frame cavity 17 the usual crank 50 so that rotation of the crank imparts rotation to the spooling member.

Normally projecting outwardly from the peripheral surface of the flange 38 are diametrically opposed pickup pins 52 and 54 which engage the fishing line 28 passing outwardly from the spool 34 across the surface of flange 38 and then downwardly through the eyelet 26 in the cover. Consequently, during rotation of spooling member 36 by crank 50, line convolutes onto the line spool 34.

In order to free the line 28 for casting, pickup pins 52 and 54 are retracted inwardly towards the center off the spooling member by means of a trigger 56 communicating with the pickup pins 52 and 54 through a linkage pin 58 in contact with pin 40 so that the peripheral surface of flange 38 will be unobstructed and a line 28 may freely spiral from line spool 34 without rotation thereof.

The reel further contains the normal drag or braking mechanism for adjustably controlling the flow of line from the reel when the fisherman is playing a fish.

The construction of and cooperation between all the components heretofore discussed with the exception of the line spool 34 are commonly known in the industry. Reference is made to U.S. Pats. Nos. 3,023,978, issued Mar. 6, 1962; and 3,061,230, issued Oct. 30, 1062, for detailed discussions of the construction and cooperation thereof.

The novelty of the present invention lies in the line storage spool and the specific attachment thereof to the frame to which specific language will now be directed.

Looking now at line spool 34, it will be seen that such spool contains a rearward line storage area 60 and, forward thereof, a forward line storage area 62. The two storage areas are concentric with each other and separated by a common flange 64. Note should be taken that even though the area of the forward storage spool 62 as shown is less than that of the rearward storage area 60, the invention is in no way limited to this area differential and the apparatus will operate just as easily and effectively with identically sized storage areas.

Figure 6:
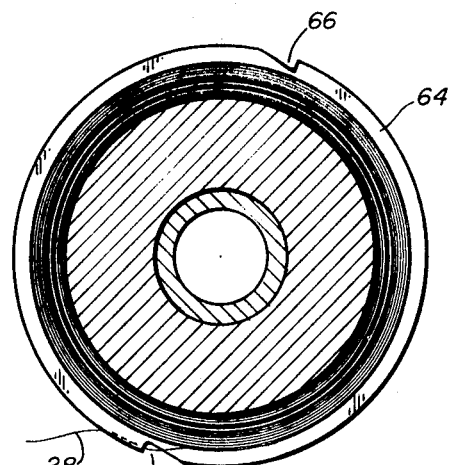
FIG. 6 is a cross-sectional view of the line spool which is an element of the invention taken along lines 6—6 of FIG. 1.

As can be seen in FIG. 6, around the periphery of the common flange 64 are a pair of notches 66 and 68. The edge of each notch slopes gradually inwardly in a clockwise direction and then outwardly in a reverse direction and this outwardly in a reverse direction to form a nook. Thus line spiraling counterclockwise from the spool around the peripheral edge of the common flange 64 will naturally flow into the notch and become tenaciously captured therein.

Spool 34 is interconnected to frame 12 by being suitably secured to circular holding plate 70 which has two diametrically opposed rearwardly extending struts 72 and 74 passing through apertures in the faceplates 16.

A yoke 76 rigidly held thereon by slip washers rigidly captured in annular grooves in each of the struts interconnects the struts at the rearward end thereof. The yoke contains a transverse aperture 78 through which linkage pin 58 passes and an elongated slot 80 cut into one side. Journaled over each of the struts 72 and 74 and confined between faceplate 16 and yoke 76 are forwardly biased coiled springs 82 and 83. Additional forward biasment of the spool is accomplished by confining a third coil spring 84 between the forward surface or the faceplate 16 and the holding plate 70.

The line spool 34, so received on the frame, can slidably travel between a forward and a rearward position, the normal position being the forward one.

Figure 4:
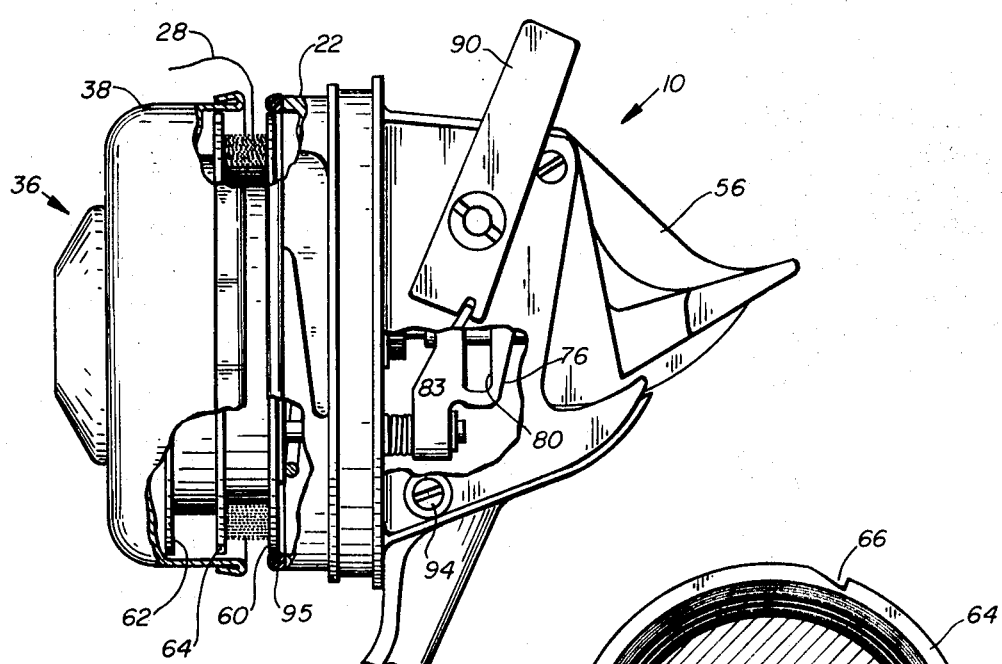
FIG. 4 is a side view with partial cutaways illustrating the position of the line spool and the travel mechanism in the forward position thereof.

As shown in FIG. 4, when the spool is in the normal forward position, the rearward edge of flange 38 is outwardly of the rearward storage area and the operation of the reel is the same as in a standard commercially available spin-cast reel; that is, the primary storage area receives line during rotation of the spooling member and releases line during casting.

Figure 3:
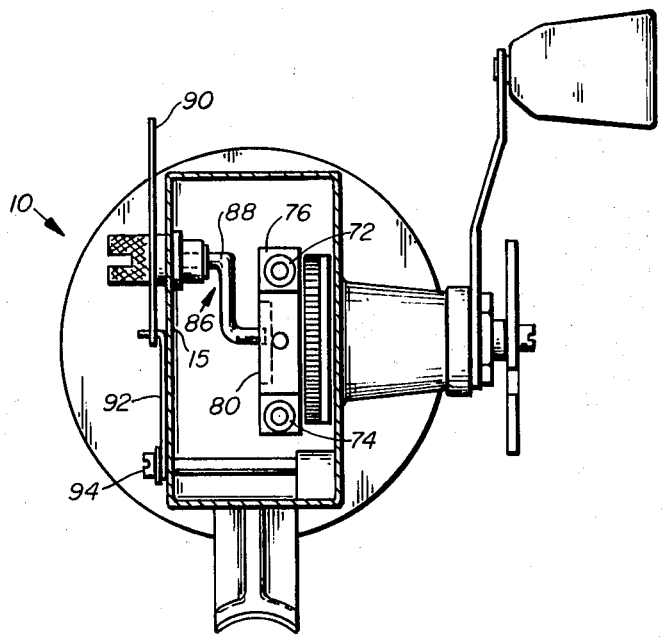
FIG. 3 is a view of the reel as taken along lines 3—3 of FIG. 2.

Turning now to FIG. 3, a travel mechanism 86 for line spool 34 includes a crank arm 88 which passes through an apertured collar in sideplate 15 and is engaged in elongated slot 80 and a lever 90 keyed to crank arm 88 exterior of the frame to facilitate pivotal movement of crank arm 88. A leaf spring 92 having one end fastened to the frame such as by a screw 94 and the other end engaged in a slot in the lower end of lever 90 creates a sufficient reverse biasment when the lever 90 is in the position corresponding to rearward positioning of the line spool to surpass the forward biasment force of the coil springs 82, 83 and 84 retain the spool 34 in the rearward position. However, additional forward biasment on the line spool created by the pull of a fish when hooked supplements the forward urging of the leaf spring 92, thereby allowing the line spool to slide into the normal forward position and the line-braking action to be operable.

Looking now at the forward edge of flange 22, epoxied thereon around the entire periphery thereof is a resilient O-ring 86 which cooperates with the flange to form a receptacle 96 of sufficient width to capture the primary storage area 60 when the line spool is in the rearward position. In such position, the rubber ring frictionally engages the peripheral edge of common flange 64.

Figure 5:
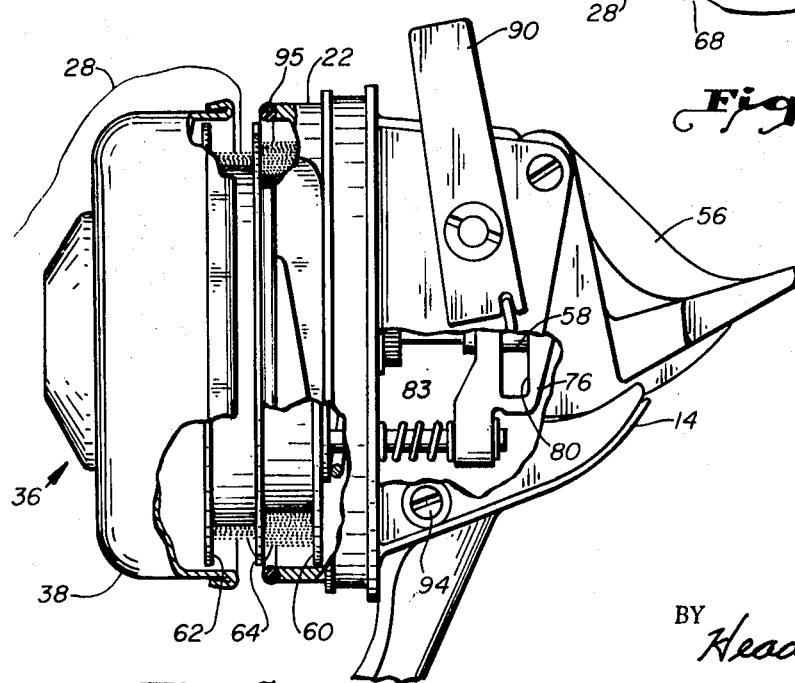
FIG. 5 is a side view of the apparatus with partial cutaways illustrating the position of the line spool and the travel mechanism in the rearward position.

When the line spool is in the rearward position, the forward storage area 62 assumes the relative spatiality to the spooling member 36 which the rearward storage area formerly has as shown in FIG. 5. During rotation of the spooling member 36, line is convoluted onto the forward storage area and during casting the line will continuously spiral therefrom until the length of line received thereon during the spooling cycle is surrendered whereupon the line will travel counterclockwise around the periphery of common flange 64 and glide into one of the notches 66 which prevents surrender of the residual line from the rearward storage area.

In operation, the fisherman places the reel 10 on a fishing rod, threads the line though the grommets and readies his hook. He positions the line spool in the forward position and makes successive casts in the usual manner using the line on the primary storage spool until he has found the exact spot where the fish are biting. He then pivots lever 90 forwardly to move the line storage spool 34 into the rearward position. The forward storage area is now presented for receiving line and the rearward storage area is captured in the receptacle 96. Leaf spring 92 holds the line spool in the rearward position.

The fisherman reels the line in and the line is convoluted onto the second storage area 62. As long as the line spool is retained in he rearward position, only this length of line will be available for subsequent casts. Thus the length of line released during each casting will be constant.

When a fish takes the hook and runs with the line, its forward pull force coupled with the forward biasment of springs 82, 83 and 84 will overcome the reverse biasment of leaf spring 92 and the spool will be drawn into the forward position whereupon the rearward storage area will again be presented to surrender of line and the reel will again operate in a conventional manner.

During the description of the preferred embodiment of this invention, specific terminology has been utilized for the sake of clarity. However, it is to be understood that such words are not to be construed as words of limitation but include all equivalents which operate in a similar manner to accomplish similar results. For example, although the device has been described as applying to a closed face spinning reel, the invention could just as easily be used on an open faced spinning reel. Also, dual storage area spools and the travel mechanism could easily be manufactured as a kit to be installed on a conventional spin-cast reel.

What is claimed:

1. A spin cast fishing reel of the type wherein a revolved spool member convolutes a continuous length of monofilament line onto a nonrotating line spool and wherein the line is spirally surrendered from said line spool during casting, including means for operably controlling the length of line surrendered from said line spool during casting comprising:

a rearward and a forward line storage area on said line spool, said areas being coaxial and having line communication therebetween;

an operable travel mechanism providing sliding movement of said line spool relative to said spool member between a normal forward and a rearward position; and means for releasably securing said line spool in said rearward position whereby said line spool presents said forward line storage area for accepting line thereon during revolution of said spool member and for surrender of line for journey therefrom during casting; said rearward line storage area being simultaneously excluded from accepting line during revolution of said spool member and from surrendering line during casting.

2. A fishing reel as in claim 1 wherein said forward and said rearward line storage areas are formed by two coaxial juxtaposed spools separated by a common outwardly extending flange having around the periphery thereof a plurality of notches enabling said line to communicate therebetween.

3. A fishing reel as in claim 1 including:

a frame having a forward end plate and sideplates defining a substantially hollow interior;

a circular flange forwardly extending from said end plate around the periphery thereof to form a receptacle for receiving said rearward primary storage area when said spool is in said rearward position; and an annular ring of compliant material carried on the forward inner periphery of said flange.

4. A fishing reel as in claim 3 wherein one of said sideplates has an aperture therein and wherein said travel mechanism comprises:

parallel shafts perpendicularly attached to said line spool and extending rearwardly therefrom into the hollow interior of said frame;

a yoke attached to the respective rearward ends of said shafts, said yoke containing an elongated vertical slot;

a crank slidably engaged at one end in said slot on said yoke and rotatably passing through said aperture in said sideplate of said frame; and an operable lever pivotally attached to said crank.

5. A fishing reel as in claim 4 wherein:

each of said shafts has journaled thereover an expansion coil spring confined between said end plate of said frame and said yoke, said springs being forwardly biased to draw said line spool into said normal forward position, and including a rearwardly biased spring engageable with said lever when said line spool is in said rearward position to overcome the forward biasment of said expansion springs and to retain said spool in said rearward position.